US008210783B2

(12) United States Patent
Morrison

(10) Patent No.: US 8,210,783 B2
(45) Date of Patent: Jul. 3, 2012

(54) THREADED FASTENER WITH PREDETERMINED TORQUE

(76) Inventor: Robert Morrison, Aberdeen (GB)

( * ) Notice: Subject to any disclaimer, the term of this patent is extended or adjusted under 35 U.S.C. 154(b) by 413 days.

(21) Appl. No.: 12/438,473

(22) PCT Filed: Oct. 4, 2007

(86) PCT No.: PCT/GB2007/003764
§ 371 (c)(1),
(2), (4) Date: Sep. 8, 2009

(87) PCT Pub. No.: WO2008/040977
PCT Pub. Date: Oct. 4, 2008

(65) Prior Publication Data
US 2010/0014936 A1 Jan. 21, 2010

(30) Foreign Application Priority Data

Oct. 5, 2006 (GB) .................................. 0619661.2
Feb. 28, 2007 (WO) ................ PCT/GB2007/000706

(51) Int. Cl.
F16B 31/02 (2006.01)
(52) U.S. Cl. ............................. 411/9; 411/432; 411/937
(58) Field of Classification Search .................. 411/5, 8,
411/9, 10, 14, 260, 277, 313, 383, 432, 917,
411/937, 967
See application file for complete search history.

(56) References Cited

U.S. PATENT DOCUMENTS

| 460,266 A | | 9/1891 | Nicholl | |
|---|---|---|---|---|
| 2,222,460 A | * | 11/1940 | Crowley | 411/285 |
| 2,363,680 A | * | 11/1944 | Luce | 411/285 |
| 2,385,390 A | * | 9/1945 | Tripp | 411/288 |
| 2,393,520 A | * | 1/1946 | Crowther | 411/276 |
| 2,551,102 A | * | 5/1951 | Delaney | 411/277 |
| 2,677,407 A | * | 5/1954 | McKenzie | 411/272 |
| 3,383,974 A | | 5/1968 | Dahl | |
| 3,834,269 A | | 9/1974 | Ohringer | |
| 4,069,854 A | * | 1/1978 | Heighberger | 411/277 |
| 4,293,256 A | | 10/1981 | Pamer | |
| 5,020,953 A | * | 6/1991 | Wada | 411/247 |
| 2003/0039527 A1 | | 2/2003 | Schatz | |

* cited by examiner

Primary Examiner — Victor Batson
Assistant Examiner — Roberta Delisle
(74) Attorney, Agent, or Firm — Dickinson Wright PLLC

(57) ABSTRACT

The invention relates to a threaded fastener. In particular, the invention relates to a threaded fastener such as a nut or a bolt. In an embodiment of the invention, a threaded fastener in the form of a nut (10) is disclosed. The nut comprises a main body portion (12); a lip portion (14) extending from the main body portion; and a recess (16) formed in the main body portion adjacent the lip portion. The recess is shaped to receive at least part of the deformable lip portion when a mating torque is applied to the fastener causing the deformable lip portion to deform. In this fashion, when the fastener is used to clamp two or more components together, such as flanges (20, 22) on adjacent pipe sections, the lip portion encounters a surface of the component that the fastener is being used to clamp against. As the fastener is torqued-up to a desired level, to provide a determined mating force, the lip portion is deformed into the recess in the main body portion.

13 Claims, 4 Drawing Sheets

THREADED FASTENER WITH PREDETERMINED TORQUE

CROSS REFERENCE TO RELATED APPLICATIONS

The present application is a 35 U.S.C. §371 national stage filing of International Patent Application No. PCT/GB2007/003764, filed Oct. 4, 2007, and through which priority is claimed to PCT/GB2007/000706, filed Feb. 28, 2007, and Great Britain Patent Application No. 0619661.2, filed Oct. 5, 2006.

The present invention relates to a threaded fastener. In particular, but not exclusively, the present invention relates to a threaded fastener such as a nut or a bolt.

Threaded nut and bolt type fasteners are used widely where it is desired to securely clamp two or more components together. In many industries, it is important that nut and bolt assemblies are torqued-up to a specified level, in order to provide a determined mating force between the components being clamped together.

One situation where it is important that a determined mating force is applied is where a pipeline is being constructed from a series of pipe sections coupled together end-to-end. The pipes are coupled by clamping flanges on adjacent pipes together using nut and bolt assemblies, the bolts passing through bores formed in the flanges. A sufficiently high mating force must be applied to the flanges in order to ensure that a fluid-tight seal is provided between the flanges, and thus between the pipes themselves, in use of the pipeline.

With this in mind, the manufacturers of nut and bolt assemblies must carefully assess the load carrying capacity of the nut/bolt and its ability to transmit a clamping force on to the components being coupled together. To this end, the manufacturers must adhere to strict requirements laid out in industry standard tables of the mating torque required to provide a mating force of a specified value, taking account of factors such as nut/bolt dimensions; thread pitch and dimensions; the physical characteristics of the material used in manufacture of the nut/bolt; surface friction coefficients; and the physical properties of any thread lubricants or sealants used.

However, this requires an operator fitting the nut/bolt to consult these tables and to carry out certain complex calculations when determining the torque to be applied to the nut/bolt in question, in order to provide the desired mating force. Unfortunately, there is a tendency for the operator simply to torque up the nut/bolt to as high a level as possible without it shearing or stripping the nut/bolt threads. This is particularly true where the operator is working in a harsh environment such as on an offshore oil rig. Loading the nut/bolt in this fashion results in it being over-torqued beyond its load carrying capacity and can, in extreme circumstances, lead to failure of the nut/bolt.

This is a particular problem in relation to pipelines comprising pipe sections connected as described above. This is because the pipes experience significant pressure forces when fluids are passed along the pipeline, particularly high temperature/high pressure fluids found in the oil and gas exploration and production industry. When the fluids are passed along the pipeline, large fluid pressure forces are applied to the joined flanges, stressing the nut and bolt assemblies. When the assemblies have been over-torqued, this can lead to the nuts/bolts failing under the excess load. In the case of a subsea pipeline located on the seafloor, this can have catastrophic consequences and is extremely difficult to remedy.

It will be appreciated that problems also exist where a nut and bolt assembly is accidentally under-torqued, resulting in an insufficient mating force being applied to the components being clamped together. Such under-torquing can lead to nut 'backing-off' in use, potentially resulting in the components becoming separated and, in the example use of coupling pipe sections together, may lead to undesired fluid egress from or ingress into the pipeline.

Whilst the above problems are a particular concern in the oil and gas exploration and production industry, it will be understood that the problems described above are also relevant in fasteners used in other industries.

It is therefore amongst the objects of embodiments of the present invention to obviate or mitigate at least one of the foregoing disadvantages.

According to a first aspect of the present invention, there is provides a threaded fastener comprising:
a main body portion;
a lip portion extending from the main body portion; and
a recess formed in the main body portion adjacent the lip portion, the recess shaped to receive at least part of the deformable lip portion when a mating torque is applied to the fastener causing the deformable lip portion to deform.

In this fashion, when the fastener is used to clamp two or more components together, such as flanges on adjacent pipe sections, the lip portion encounters a surface of the component that the fastener is being used to clamp against. As the fastener is torqued-up to a desired level, to provide a determined mating force, the lip portion is deformed into the recess in the main body portion.

Preferably the lip portion deforms into the recess on application of a determined mating force, the mating force itself determined by the mating torque applied to the fastener. The shape and dimensions of the lip portion may be selected such that the lip portion deforms into the recess at a determined applied mating torque. In this fashion, deformation of the lip portion to reside within the recess acts as a 'tell-tale' for the operator, indicating that the fastener has been torqued-up to the required level and that further application of torque is not required. Accordingly, it will be understood that the lip portion may be a tell-tale.

The fastener may be a nut having a threaded bore extending therethrough adapted to receive a threaded bolt/shaft; or may be bolt having a threaded shaft adapted to be received within a threaded bore of a nut, or within a threaded bore in a component to be clamped. Where the fastener is a nut, the main body portion of the nut may be multi-faceted (for example, defining six surfaces and thus hex-headed), defining a number of drive surfaces for engagement with a torque tool. In a similar fashion, where the fastener is a bolt, the main body portion may define a head of the nut and may be multi-faceted (for example, defining six surfaces and thus hex-headed), defining a number of drive surfaces for engagement with a torque tool.

The lip portion may extend from a surface of the main body portion, and may extend from the same surface of the main body portion as that in which the recess is provided. The lip portion may be upstanding from the body portion, in particular from the surface, and may extend in a direction of a longitudinal axis of the fastener (which may be a longitudinal axis of a threaded bore or threaded shaft of the fastener).

The lip portion may be tapered and may have at least one surface which is at least partially inclined relative to a longitudinal axis of the fastener (which may be a longitudinal axis of a threaded bore or threaded shaft of the fastener). Inclining the surface in this fashion may encourage the lip portion to deform into the recess when the fastener is torqued-up. Said at least part of the lip portion surface may be inclined towards the fastener longitudinal axis, such that the lip portion is encouraged to deform radially inwardly, relative to the longitudinal axis of the fastener, when the fastener is torqued-up. It will therefore be understood that the recess may be provided radially inwardly of the lip potion.

The lip portion may have radially outer and radially inner surfaces, relative to the longitudinal axis of the fastener, and at least part of both the outer and inner surfaces may be inclined relative to the fastener longitudinal axis. At least part of the inner wall of the lip portion may be disposed parallel to the longitudinal axis of the fastener, and a fold line may be defined at a junction between the part of the inner wall disposed parallel to the fastener longitudinal axis and a part of the inner wall disposed inclined to the fastener longitudinal axis. In this fashion, the lip portion may be encouraged to deform about the fold line when the fastener is torqued-up, to encourage the lip portion to deform into the recess in a controlled fashion.

The lip portion may be generally annular and may extend in an unbroken ring around the fastener. Alternatively, the lip portion may comprise a plurality of lip portion segments which together define the lip portion. The lip portion segments may be spaced circumferentially around the fastener, that is the lip portions may (in an undeformed state) be spaced from one-another such that spaces exist between adjacent circumferential faces of the lip portions. Alternatively, the lip portions may be located in abutment (at least when in an undeformed state), such that adjacent circumferential faces of the lip portions are in abutment.

The lip portion is preferably formed integrally with the main body portion. In this fashion, in the event that the lip portion of the fastener is located within the recess, this provides an indication to an operator that the fastener has been used on a prior occasion. However, in an alternative embodiment, the lip portion may be provided as a separate component adapted to be coupled to/mounted on the main body portion. This may readily facilitate reuse of the fastener, if desired.

Where the fastener comprises a threaded bore extending therethrough, the recess may be provided adjacent an end of the bore, and may extend radially outwardly, relative to a longitudinal axis of the bore, from an edge of the bore towards the lip portion. Alternatively, the recess may extend part way between the lip portion and an edge of the bore.

A part or parts of the main body portion located radially outwardly of the lip portion, relative to a longitudinal axis of the fastener, may define a ramp or ramps and may be inclined relative to the longitudinal axis. In a particular embodiment, the ramp or ramps may be inclined at 45° to the longitudinal axis. Alternatively, the ramp or ramps may have an arcuate surface.

Providing a ramp which is inclined in this fashion may assist in determining that the fastener has been correctly torqued. This is because, in the event that the fastener has been over-torqued (beyond the point at which the lip portion has been deformed into the recess), the main body portion, in particular the ramp, may itself be deformed. Thus providing the ramp gives an indication to an operator that the fastener has been over-torqued, through deformation of the ramp. It will be understood that such deformation of the ramp results in a space between an outer edge of the ramp and a surface to which the fastener is being mated being reduced. Accordingly, an operator may gauge whether the fastener has been so over-torqued by measuring the dimension of the space. If the dimension of the space is less than a determined level, this indicates that the ramp has been deformed and thus that the fastener has been over-torqued.

Furthermore, provision of the ramp permits the space to be readily measured using a measuring tool or gauge of a dimension corresponding to the dimension of the space (assuming no over-torquing of the fastener and thus no deformation of the ramp). Such a gauge may comprise two generally C-shaped elements which together form an annular ring. In the event that the fastener has been over-torqued, the elements would not meet when fitted into the space. In the event that the fastener had been under-torqued, the elements would be a loose fit (and also the lip portion would be visible, having not been fully deformed into the recess).

The lip portion may be deformable from an extended position in which the lip portion extends from a surface of the main body portion, and a deformed position in which the lip portion is entirely received within the recess.

According to a second aspect of the present invention, there is provides a threaded fastener comprising:
a main body portion;
a lip portion extending from the main body portion; and
an area in the main body portion adjacent the lip portion, the area shaped to receive at least part of the deformable lip portion on deformation thereof.

The lip portion may be deformable from an extended position in which the lip portion extends from a surface of the main body portion, and a deformed position in which the lip portion is entirely received within the area in the main body portion.

Further features of the fastener of the second aspect of the present invention in common with the fastener of the first aspect of the present invention are defined above in relation to the first aspect.

An embodiment of the present invention will now be described, by way of example only, with reference to the accompanying drawings, in which.

Figure 1:
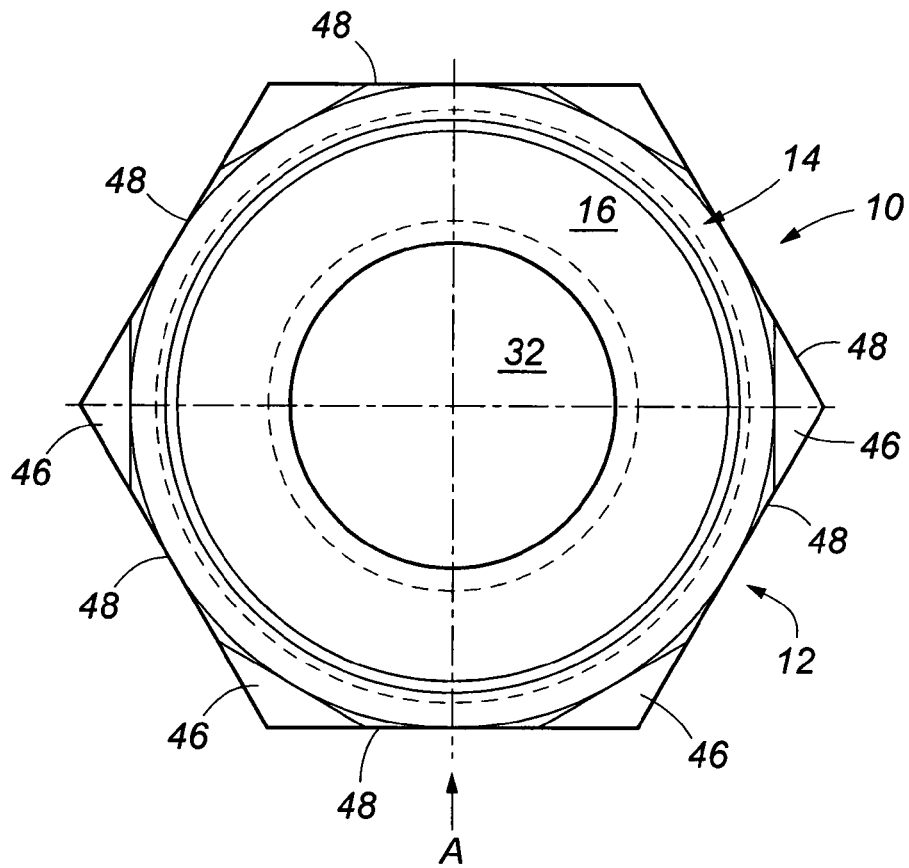
FIG. 1 is a plan view of a fastener in the form of a nut, according to an embodiment of the present invention.
Figure 2:
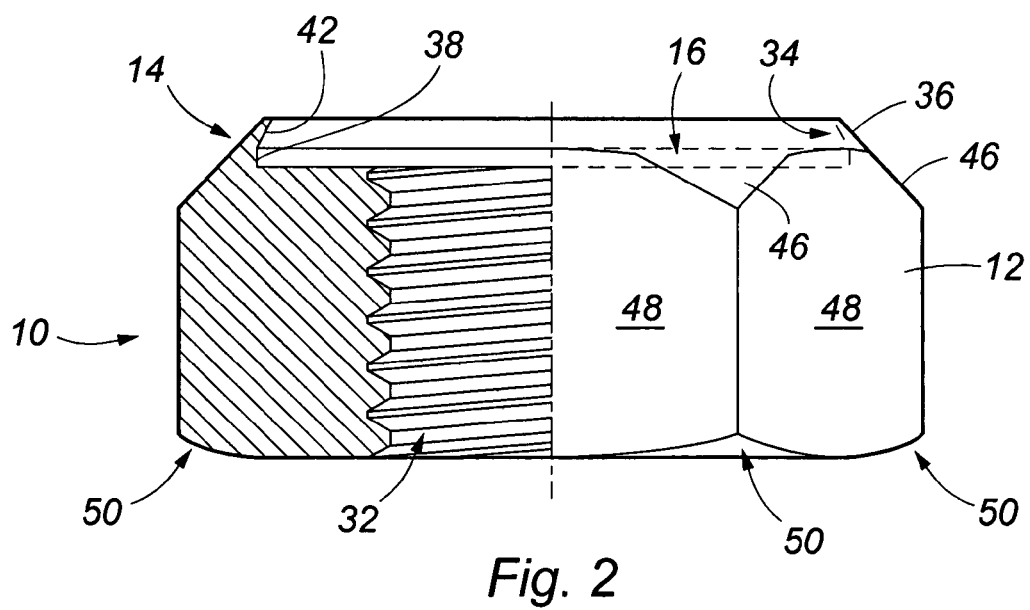
FIG. 2 is a half-sectional side view of the nut shown in FIG. 1, taken in the direction of the arrow A in FIG. 1.

Turning firstly to FIG. 1, there is shown a plan view of a fastener in the form of a nut, according to an embodiment of the present invention, the nut indicated generally by reference numeral 10. The nut 10 is also shown in the half-sectional side view of FIG. 2, which is taken in the direction of the arrow A in FIG. 1.

The nut 10 generally comprises a main body portion 12, a lip portion or nib 14 extending from the main body portion 12, and a recess 16 formed in the main body portion 12 adjacent the lip portion 14. As will be described in more detail below, the recess 16 is shaped to receive at least part of the deformable lip portion 14 when a mating torque is applied to the nut 10 causing the deformable lip portion to deform.

In this fashion, when the nut is used to clamp two or more components together, the lip portion 14 encounters a surface of the component that the fastener is being used to clamp against. As the nut 10 is torqued-up to a desired level, to provide a determined mating force, the lip portion 14 is deformed into the recess 16 in the main body portion 12 of the nut.

The shape and dimensions of the lip portion 14, and the material of the nut 10, are selected such that the lip portion deforms into the recess or counter-bore 16 at a determined applied mating torque. In this fashion, deformation of the lip portion 14 to reside within the recess 16 acts as a 'tell-tale' for an operator, indicating that the nut 10 has been torqued-up to the required level, and that further application of torque is not required.

Figure 3:
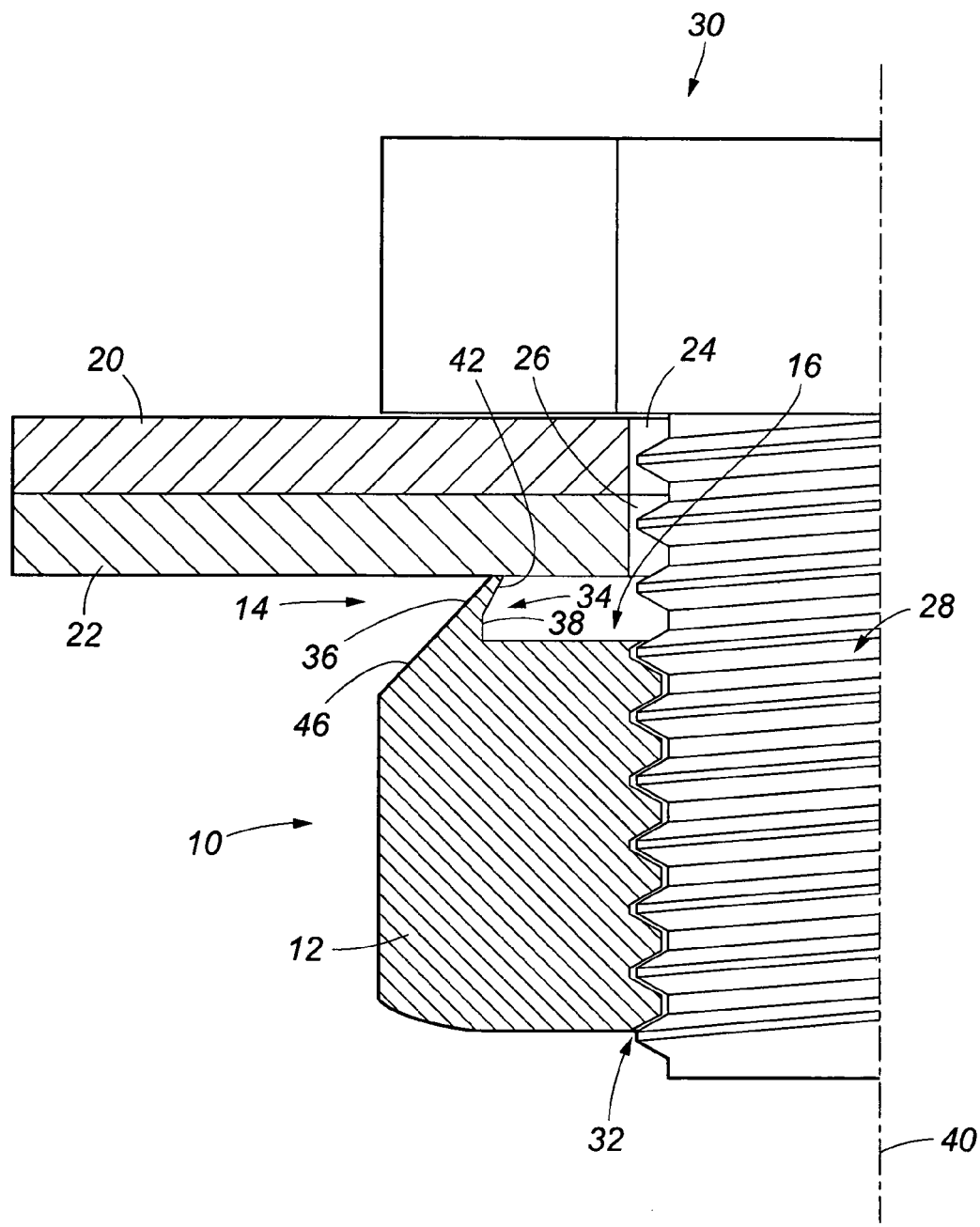
FIG. 3 is a view illustrating the nut of FIG. 1, and a bolt of conventional construction, in use during clamping of two components in the form of pipe flanges together.

The nut 10 and its operation in use will now be described in more detail with reference also to FIG. 3, which is a view illustrating the nut 10 and a bolt 18 of conventional construction in use, during clamping of two components in the form of pipe flanges 20 and 22 together. Only parts of the nut 10, bolt 18 and flanges 20, 22 are shown in FIG. 3, for ease of illustration. Additionally, the nut 10 is illustrated in section, in a similar fashion to that shown in the left hand side of FIG. 2, and the flanges 20 and 22 are also shown in section.

As will readily be understood by persons skilled in the art, the flanges 20 and 22 are each provided on respective pipe sections (not shown) which are to be coupled together using the nut 10 and bolt 18. The flanges 20, 22 are annular and extend around the circumferences of the respective pipe sections, and include a number of bores or apertures 24 and 26, respectively (one of each shown in FIG. 3). When the pipe sections are to be coupled together, the flanges 20, 22 are brought into abutment such that the bores 24 in the flange 20 align with the bores 26 in the flange 22. Bolts 18 are then located in each set of aligned apertures 24 and 26, a threaded shaft 28 of the bolt 18 extending through the apertures, and a hex-head 30 of the bolt 18 located in abutment with the flange 20.

The nut 10 is then coupled to the bolt 18, the threaded shaft 28 of the bolt 18 received in a threaded bore 32 of the nut 10. The nut 10 is then rotated to advance it along the bolt shaft 28 until such time as the lip portion 14 comes into contact with the flange 22, as shown in FIG. 3. This may be achieved manually or with the aid of a suitable torque-tool such as a torque wrench (not shown). The nut 10 is then further rotated using the torque wrench, to advance the nut 10 further along the bolt shaft 28. The torque applied to the nut 10 is carefully selected by the operator to provide a mating force of a specified value.

The lip portion 14 is machined after casting, and is generally tapered, including radially inner and outer surfaces 34 and 36. The inner surface 34 includes a part 38 which is disposed parallel to an axis 40 of the nut bore 32, and a part 42 which is inclined towards the axis 40. Additionally, the entire outer surface 36 of the lip portion 14 is inclined towards the bore axis 40. It will be understood that the angle of taper of the lip portion surfaces 34 and 36, and indeed the volume of material in the lip portion 14 itself, is determined through basic experimentation and correlation to the torque values required to achieve deformation.

Figure 4:
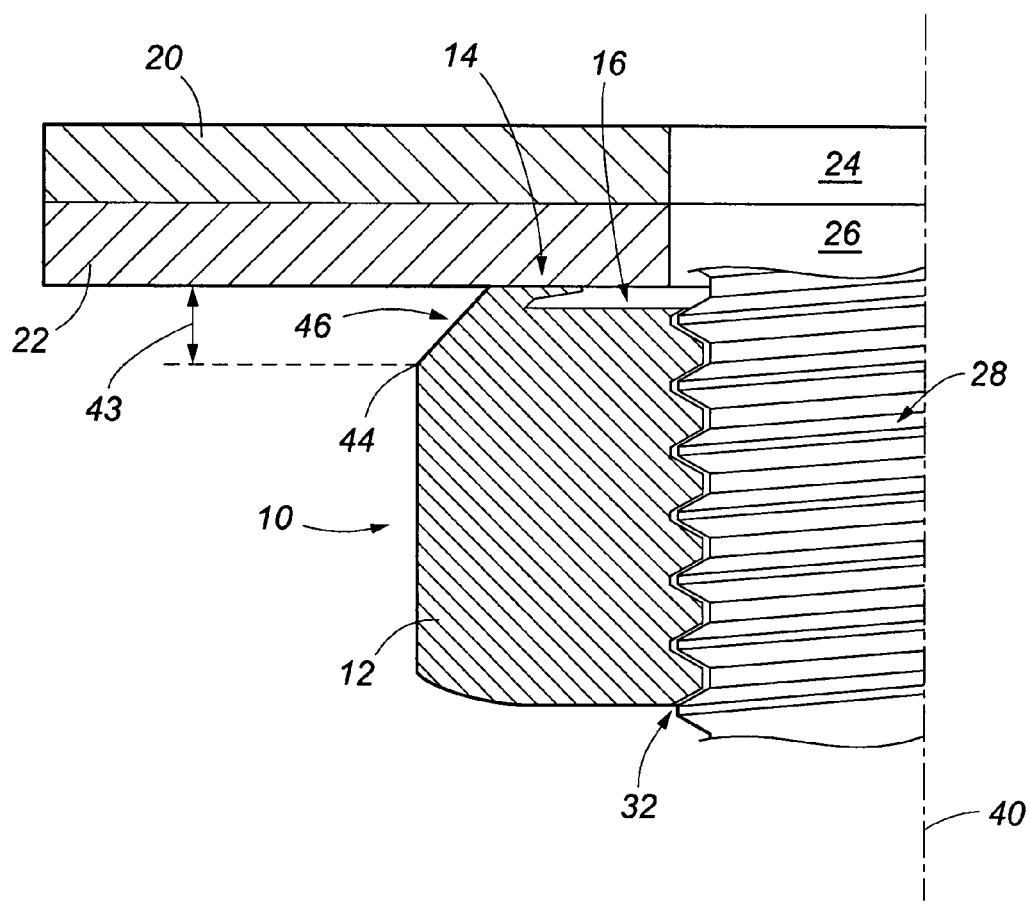
FIG. 4 is a view similar to FIG. 3, showing the nut after it has been torqued-up, with a lip portion of the nut deformed into a recess in a main body portion of the nut.

As the nut 10 is torqued-up, the lip portion 14 is deformed into the recess 16, as shown in FIG. 4. This deformation of the lip portion 14 is controlled and assisted by the provision of the outer surface 36 and the part 42 of the inner surface 34 inclined towards the bore axis 40. Furthermore, providing the inner surface 34 with the parallel part 38 and the inclined part 42 effectively forms a fold-line at the point where the parts intersect. In this fashion, when the lip portion 14 is loaded as described above, the lip portion tends to deform about the fold-line.

The nut 10 is shown in FIG. 4 following torque-up to the level required to provide the desired mating force between the nut 10 and the bolt 18, and thus between the flanges 20 and 22. In this position, a space 43 defined between edges 44 of 45° inclined ramps 46 (formed at the junction of adjacent flats 48 of the nut 10) and the flange 22 is of a predetermined dimension. The dimension and inclination of the ramps 46 is selected such that the space 43 is at said predetermined dimension when the determined mating torque is applied to the nut 10, and the lip portion 14 deformed as shown in FIG. 4. In this fashion, providing ramps 46 which are inclined in this fashion assists in determining that the nut 10 has been correctly torqued.

Figure 5:
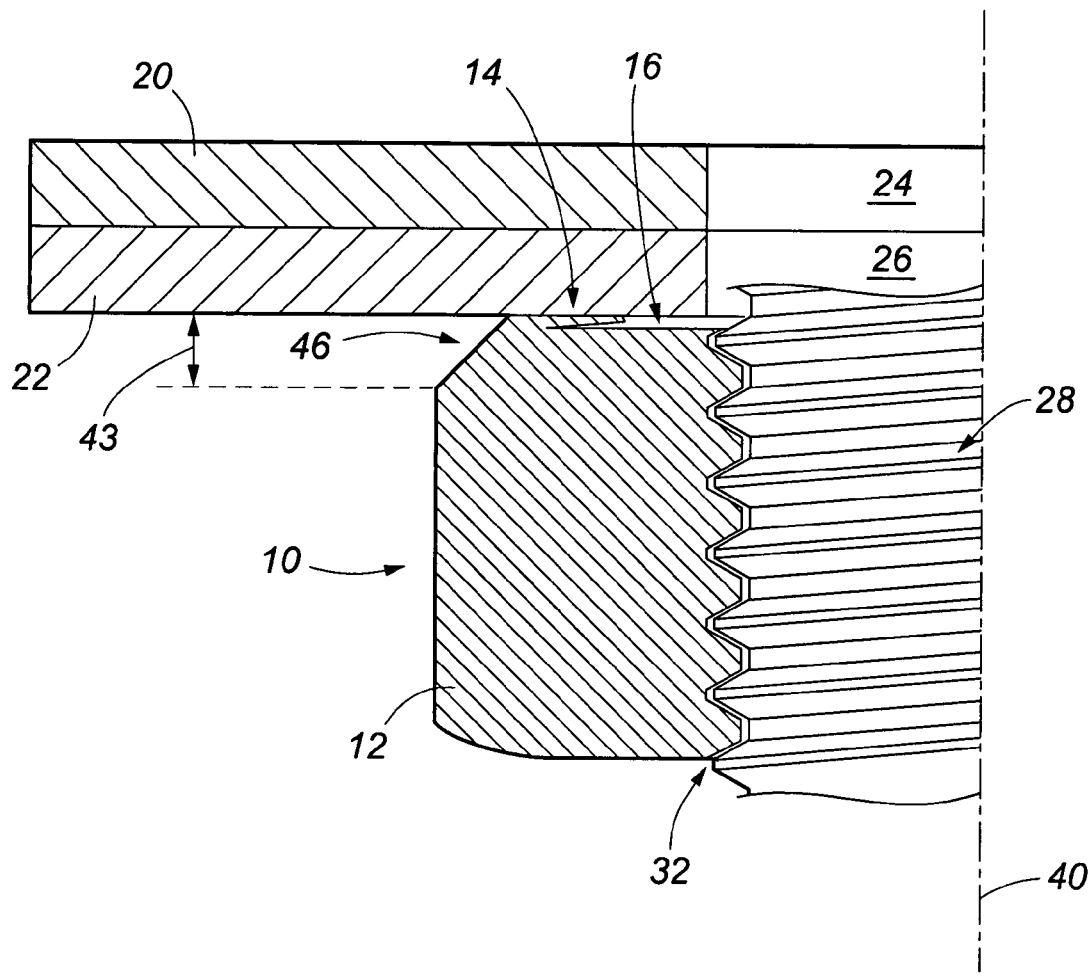
FIG. 5 is a view similar to FIG. 3, showing the nut following further application of torque.

This is because further application of torque following deformation of the lip portion 14 into the recess 16 (as shown in FIG. 4) causes a further deformation of the lip portion 14, and also deforms the ramps 46, as shown in FIG. 5. This in turn causes a reduction in the size of the spaces 43 between the edges 44 and the flange 22, thereby providing an indication to an operator that the nut 10 has been over-torqued. The operator may gauge whether the nut 10 has been so over-torqued by measuring the dimension of the space 43 and, if the dimension of the space is less than the predetermined level for the desired mating force, this indicates that the ramps 46 have been deformed and thus that the nut 10 has been over-torqued.

A simple method of gauging whether the nut 10 has been over-torqued is to insert a gauge tool into the space 43. A suitable tool comprises two generally C-shaped elements (not shown) which, when fitted together, form an annular ring. A central hole in the ring is dimensioned such that an inner circumferential edge of the ring will sit on the ramps 46 with an outer circumferential edge aligned with the outer edges 44. If the nut 10 has been over-torqued, the elements will protrude beyond the edges 44 and will not meet to form the ring. Remedial action may then be taken which could include replacement of the nut 10.

In a similar fashion, the gauge elements may also provide an indication to an operator that the nut 10 has not been torqued-up to the required level. This is because, in this situation, the space 43 would be larger than that found when the nut 10 has been torqued-up correctly, and the elements would be a loose fit on the ramps 46. Additionally however, in the event that the nut 10 is under-torqued, the lip portion 14 will not reside within the recess 16 as shown in FIG. 3, and will be visible to the operator, providing a visual indication that the appropriate mating torque has not been applied. To assist an operator in judging correct torquing of the nut 10, the lip portion 14 (and/or a surface of the nut 10 adjacent the flange 22) may carry indication markings or may be coloured so as to stand out from the body portion 12 (or a remainder of the body portion). In this fashion, when the markings or colour can no longer be viewed, the operator will know that the nut 10 has been correctly torqued. It will be understood, however, that an alternative tool such as a micrometer may be utilised.

The nut 10 is easily constructed by casting of the main body portion 12 of the nut and subsequent machining to form the lip portions 14. Additionally, the ramps 46 are each machined after casting, edge regions of the nut 10 in the area of the ramps 46 prior to casting being rounded in a similar fashion to corresponding areas 50 (FIG. 1) on the other end of the nut 10. However, it will be understood that other appropriate manufacturing methods may be employed.

Whilst the invention has been described above in relation to a fastener in the form of a nut, it will be understood that the principles of the invention apply equally in relation to other fasteners, particularly bolts. For example, a standard bolt such as the bolt 18 shown in FIG. 3 may be modified to include a lip portion and a recess, similar to the lip portion 14 and recess 16 of the nut 10. The lip portion and the recess would of course be provided on an underside of the hex head 30 which abuts a surface of the component being clamped, such as the flange 20.

The present invention offers numerous advantages over prior fasteners. These include that, inter alia, when the nut or bolt is used with a corresponding bolt or nut of poor quality (having a tendency to shear under a stated design loading), correct torquing of the nut or bolt of the invention according to the principles described above may cause the inferior bolt or nut to shear, highlighting the deficiency in quality at an early stage.

Also, mating forces of determined magnitudes may be applied to components to be joined without the operator requiring to carry out complex calculations, as the physical properties of the lip portion on the fasteners relates back to the material/tensile strength of the fastener, and is predetermined during formation of the lip portion.

Additionally, the lip portion on the fastener may account for surface deformities in the components being coupled, and also for thread variations, which would otherwise affect mating torque.

Furthermore, the fastener may be manufactured from stainless steel/duplex/super-duplex materials (and may be cold-formed), in contrast to the relatively high-friction materials used with prior fasteners, which have a tendency to cold-weld, even at relatively low torque levels.

Furthermore, the lip portion facilitates easy identification that a fastener has been previously used.

Furthermore, the fastener may be reused providing that it has not been fatigued (over-torqued).

Furthermore, the above-described method of torque judgement means that, in use of the fastener, it is not necessary to take account of lubrication coefficients/thread type coatings. Accordingly, any such lubricants or coatings will not affect fastener performance.

Furthermore, the angled lip portion/nib design allows a predetermined collapse into the recess/counter-bore, this being calculated using tensile strengths etc. of the material used to form the fastener. Tapering the lip portion avoids problems of straight material compression where issues including surface deformities, displacement and splaying of material may otherwise hamper fastener performance.

Furthermore, the fasteners can be used without any under-head flanged collars, providing greater versatility of use, without space restriction (which can be a significant issue in certain industries, such as ASTM A193 stud-bolting used in pressure vessels and pipework).

Furthermore, in-forge stamped ID batch numbers can be applied, so that there is no doubt about fastener integrity (an operator being able to cross-check against batch test certificates), thereby avoiding used products being passed off as new.

Furthermore, following deformation of the lip portion into the recess, the effective nut depth (or depth of bolt head) may be designed to be equivalent to prior, standard, heavy-hex type nuts.

Various modifications may be made to the foregoing without departing from the spirit and scope of the present invention.

For example, the fastener may carry a number of serrations on a surface adapted to abut a component to be clamped, which serrations may assist in resisting backing-off of the fastener.

The lip portion may comprise a plurality of lip portion segments which together define the lip portion. The lip portion segments may be spaced circumferentially around the fastener, that is the lip portions may (in an undeformed state) be spaced from one-another such that spaces exist between adjacent circumferential faces of the lip portions. However, the lip portions may alternatively be located in abutment (at least when in an undeformed state), such that adjacent circumferential faces of the lip portions are in abutment.

The lip portion may be provided as a separate component adapted to be coupled to/mounted on the main body portion. This may readily facilitate reuse of the fastener, if desired.

The recess may extend part way between the lip portion and an edge of the bore. The ramps may be formed at alternative angles or may be arcuate.

A recess may be provided at each end of the fastener adjacent the threads. This allows for possible over-tapping of threads during manufacture, without detriment to the integrity of the lip portion (and thus to torque judgement).

The invention claimed is:

1. A threaded fastener comprising:
a main body portion;
a deformable lip portion extending from the main body portion, the lip portion having radially outer and radially inner surfaces, wherein at least part of both the outer and inner surfaces is inclined relative to a longitudinal axis of the fastener; and
a recess formed in the main body portion adjacent the lip portion, the recess shaped to receive at least part of the deformable lip portion when a mating torque is applied to the fastener causing the deformable lip portion to deform;
wherein at least part of the inner surface of the lip portion is disposed parallel to the longitudinal axis of the fastener, and wherein a fold line is defined at a junction between the part of the inner surface disposed parallel to the fastener longitudinal axis and a part of the inner surface disposed inclined to the fastener longitudinal axis; and
wherein parts of the main body portion located radially outwardly of the lip portion, relative to a longitudinal axis of the fastener, define at least one ramp connected to the lip portions, the at least one ramp being inclined relative to the longitudinal axis.

2. A fastener as claimed in claim 1, wherein the lip portion deforms into the recess on application of a determined mating force, the mating force determined by the mating torque applied to the fastener.

3. A fastener as claimed in claim 1, wherein the fastener is a nut having a threaded bore extending therethrough.

4. A fastener as claimed in claim 1, wherein the fastener is a bolt having a threaded shaft.

5. A fastener as claimed in claim 1, wherein the lip portion has an inclined surface, and wherein at least part of the lip portion surface is inclined towards a longitudinal axis of the fastener, such that the lip portion is encouraged to deform radially inwardly, relative to the longitudinal axis, when the fastener is torqued-up.

6. A fastener as claimed in claim 1, wherein the recess is provided radially inwardly of the lip portion.

7. A fastener as claimed in claim 1, wherein the lip portion is generally annular and extends in an unbroken ring around the fastener.

8. A fastener as claimed in claim 1, wherein the lip portion comprises a plurality of lip portion segments which together define the lip portion.

9. A fastener as claimed in claim 8, wherein the lip portion segments are located in abutment such that adjacent circumferential faces of the lip portions are in abutment.

10. A fastener as claimed in claim 1, wherein parts of the main body portion located radially outwardly of the lip portion, relative to a longitudinal axis of the fastener, define a plurality of ramps connected to the lip portions, the plurality of ramps being inclined relative to the longitudinal axis.

11. A fastener as claimed in claim 10, wherein the ramps are substantially inclined at 45° to the longitudinal axis.

12. A fastener as claimed in claim 11, wherein the ramps have arcuate surfaces.

13. A fastener as claimed in claim 1, wherein the lip portion is deformable from an extended position in which the lip portion extends from a surface of the main body portion, and a deformed position in which the lip portion is entirely received within the recess.

\* \* \* \* \*